(12) United States Patent
Menzel et al.

(10) Patent No.: US 7,373,792 B2
(45) Date of Patent: May 20, 2008

(54) METHOD FOR PRODUCING OPTICAL COMPONENTS

(75) Inventors: Andreas Menzel, Jena (DE); Frank Elsmann, Grossloebichau (DE); Norman Schoenherr, Jena (DE)

(73) Assignee: Schott AG, Mainz (DE)

( * ) Notice: Subject to any disclaimer, the term of this patent is extended or adjusted under 35 U.S.C. 154(b) by 757 days.

(21) Appl. No.: 10/218,385

(22) Filed: Aug. 14, 2002

(65) Prior Publication Data

US 2003/0061833 A1 Apr. 3, 2003

(30) Foreign Application Priority Data

Aug. 15, 2001 (DE) .................. 101 39 905

(51) Int. Cl.
*C03B 23/00* (2006.01)
*C03B 11/06* (2006.01)

(52) U.S. Cl. .................. 65/102; 65/32.1; 65/275

(58) Field of Classification Search .................. 65/102, 65/32.1, 269, 275, 319, 66, 24
See application file for complete search history.

(56) References Cited

U.S. PATENT DOCUMENTS

| | | | | |
|---|---|---|---|---|
| 4,139,677 A | * | 2/1979 | Blair et al. | 428/409 |
| 4,358,306 A | * | 11/1982 | Okamoto et al. | 65/32.5 |
| 5,443,607 A | * | 8/1995 | Englisch et al. | 65/64 |
| 5,653,779 A | * | 8/1997 | Saito et al. | 65/66 |
| 6,003,339 A | * | 12/1999 | Morikita | 65/275 |
| 6,105,395 A | * | 8/2000 | Yoshida et al. | 65/102 |
| 6,143,676 A | | 11/2000 | Ohashi et al. | |
| 6,505,484 B1 | * | 1/2003 | Fujiwara et al. | 65/66 |

FOREIGN PATENT DOCUMENTS

| | | |
|---|---|---|
| DE | 1 062 897 | 8/1959 |
| EP | 1069084 A1 * | 1/2001 |
| JP | 61-83638 | 4/1986 |

* cited by examiner

*Primary Examiner*—Carlos Lopez
(74) *Attorney, Agent, or Firm*—Jordan and Hamburg LLP

(57) ABSTRACT

For producing large volume optical components of high optical quality from synthetic quartz glass blanks, the latter are heated in a component mold in a furnace with a protective gas atmosphere to a temperature 50° to 170° K above the softening point, this temperature being held for 20 to 90 minutes and, during this holding time, the quartz glass blank being pressed into the component mold. By these means, a gentle treatment of the quartz glass, a good yield, a decrease in the energy input and a complete filling up of the component mold are achieved.

21 Claims, 1 Drawing Sheet

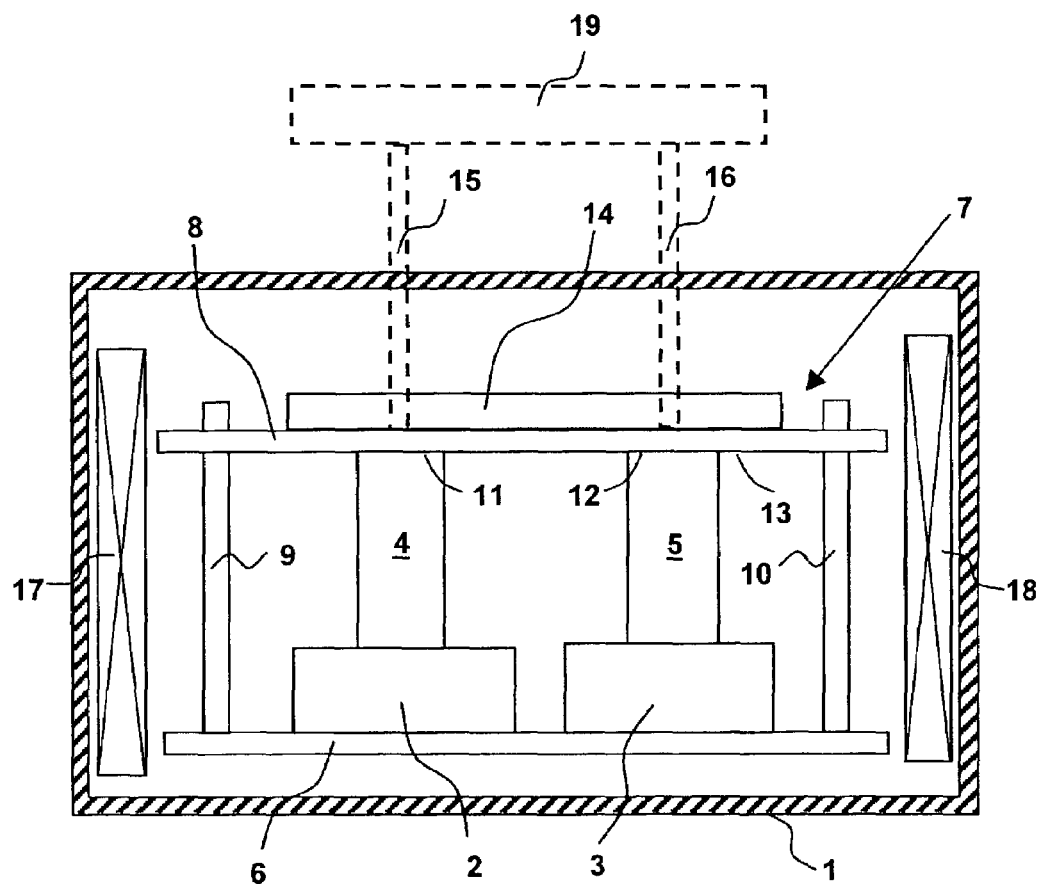

METHOD FOR PRODUCING OPTICAL COMPONENTS

The invention relates to a method and apparatus for producing large-volume optical components of high optical quality from synthetic quartz glass blanks and optical components produced therewith, in accordance with the class of the claims.

For producing quartz glass parts of large dimensions or with a refractive index of good homogeneity over large areas, it is well known that thermoforming of quartz glass blanks of smaller dimensions is necessary. For this purpose, quartz glass blanks, placed in molds of larger dimensions, are exposed for a specified time in furnaces to temperatures of about 200° K above the softening point (softening temperature ~1,600° C.). As a result, the quartz glass blank flows into a mold, the internal contour of which corresponds to the desired, new external contour of the converted quartz glass parts. A conversion in up to three consecutive steps may be necessary depending on the initial and target geometries and causes, especially in the regions of the quartz glass parts near the surface, a great change in the homogeneity of the refractive index, in the transmission and in the fluorescence, as well as in the hydrogen content. The intensity of these effects and their depth of penetration depend on the process parameters and process steps. Furthermore, local disorders in the optical homogeneity occur relatively frequently and have a negative effect on the gradient or on the residual homogeneities of the refractive index variation according to specifications for imaging systems. A method and an apparatus for molding quartz glass is known especially from the EP 1069084, for which bubbles are said to be removed from the quartz glass, a mold is designed with an elastic, gas-permeable material and the shaping takes place at temperatures ranging from 1750° to 1850° C.

It is therefore an object of the invention to create a method for producing large-volume optical components of high optical quality from synthetic quartz glass blanks in good yield, which method is gentle for the quartz glass and, in particular, does not decrease the hydrogen content and enables the energy input to be reduced and the mold to be filled completely.

Pursuant to the invention, this objective is accomplished by the characterizing distinguishing features of the present invention and defined more precisely by the distinguishing features of the present disclosure. In particular, by reducing the heating temperature to only 30° to 150° K above the softening point, the energy input required is reduced (up to 25 kWh per cycle), the hydrogen content is maintained better and the homogeneity of the refractive index, the UV transmission and the fluorescence behavior are changed less than in the case of the known method. As a result, smaller edge regions of the transformed optical components occur as waste. The pressure, exerted on the quartz glass blank, makes possible the lower heating temperature, shorter heating times or processing times and a better flow of the quartz glass blank into the mold of the component (countersunk mold), so that also the corners of the countersunk mold are filled up completely. There is also less thermal stress on the heating facility, including the furnace.

An advantageous solution arises when the heating temperature is maintained for 20 to 90 minutes, there being an indirect relationship between the magnitude of the pressure and the duration of the holding temperature. Before the pressure is exerted, the quartz glass blank can be heated at a rate of 1° to 50° K/min. The shaped quartz glass body is cooled advantageously at a rate of 50° K/min for optionally significantly less up to fractions of minutes. In one embodiment, the pressure equipment is in the furnace with an atmosphere of a protective gas (nitrogen, argon). It has a pressure plate, which is essentially parallel to the upper surface of the quartz glass blank and presses on this surface with a pressure, which may be variable. It may also be curved and preferably consists of graphite. One simple solution contains a pressure plate, which is guided tightly by means of bushings on at least two and preferably three or four graphite stands and the weight of which acts on the quartz glass blank as an external force. Compression springs can also be used instead of the weights. The pressure can also be produced by other mechanical, hydraulic and/or pneumatic devices within or without the furnace and transferred to the pressure plate by means of suitable coupling means, such as rods. Like the pressure plate, the inner bottom surface of the countersunk mold can also be curved concavely or convexly. Finally, it is possible to process several quartz glass blanks in several, optionally different countersunk molds in one pressure device. An optical component (quartz glass plate), produced by the inventive means described above, is distinguished by edge lengths or diameters of at least 500 mm.

The invention is explained in greater detail below by means of the diagrammatic drawing of an example.

In a suitably shaped furnace 1 with an inert gas atmosphere, there are two countersunk molds 2, 3, which preferably consist of graphite and have the desired dimension and internal contours. The countersunk molds can be round or rectangular and have flat or curved inner surfaces. The dimensions of their sides can be up to 1000×600 mm.

Quartz glass blanks 4, 5 are placed centrally in the countersunk molds 2, 3. They can be shaped cylindrically or rectangularly by prior processing steps (mechanical or by thermal conversion), depending on their later use. The countersunk molds 2, 3, together with the quartz glass blanks 4, 5, are placed on a base plate 6 of pressure equipment 7. A pressure plate 8, which is guided precisely parallel by guide stands 9, 10 or other suitable guiding means, is placed on the upper surface 11, 12 of the quartz glass blank 4, 5. The lower pressure surface 13 of the pressure plate 8 can be shaped basically flat, concavely or convexly. A variable pressure weight 14 is placed on the pressure plate 8. Instead of the pressure weight 14, the pressure can also be exerted by external pressure means 19 on the pressure plate 8 by means of rods or other connecting means 15, 16. The pressure weight 14 or the pressure means 19 can be of a mechanical, hydraulic and/or pneumatic nature. The pressure weight 14 is selected so that the pressure, acting on the quartz glass blanks 4, 5 is between 10 kPa and 500 kPa, such as 100 kPa.

The furnace 1 and, with that, the quartz glass blanks 4, 5 are heated with heaters 17, 18, at a rate of preferably 1° to 50° K/min, such as 10° K/min. Depending on the countersunk molds 2, 3 and the quartz glass blanks 4, 5 used, the temperature in the conversion phase is raised slightly by 50° to 170° K and particularly by 70° K above the softening point at 1600° C. or lowered by 30° to 150° K in comparison to the standard temperature lowering method of the state of the art. Due to the pressure applied, the residence time during the conversion phase can be shortened additionally by 20 to 60 minutes in comparison to that of the state of the art and shortened to only 20 to 90 minutes and, in particular, to 30 minutes.

The pressed quartz glass body is cooled preferably at a rate of less than 50° K/min and preferably of 5° K/min; different cooling periods with different cooling rates are possible. After it has been cooled, the device 7 is removed from the furnace 1 and the converted quartz glass body is removed from the countersunk mold 2, 3.

Due to the use of the pressure equipment, the countersunk mold is filled completely with quartz glass even when the dimensions are very large (such as 600×600 mm). The corners of rectangular countersunk molds are filled completely. For example, plane, convex quartz bodies can be realized. Because the countersunk molds are filled completely independently of their geometry, the yield is increased. Due to the lowering of the temperature during the conversion phase by 30° to 150° K and the simultaneous shortening of the conversion phase by 20 to 90 minutes, the thermal stress on the quartz glass is reduced clearly. Consequently, the changes in the homogeneity of the refractive index, the transmission, the fluorescence and the hydrogen content take place in a clearly smaller region close to the surface. The necessary machining of the outer surfaces of the converted quartz part can therefore be reduced by up to 10 mm, which can mean a gain in yield of up to 30%, depending on the quartz part.

Due to the pressure exerted by the pressure plate 8, which is guided parallel by the columns 9, 10, the quartz glass body is guided rigidly in the conversion phase. Deviations from the symmetry during the conversion phase are prevented. This leads, for example, to a symmetrical distribution of the refractive index in the converted quartz glass part, which causes, for example, a decrease in the refractive index gradient.

All conversion of products, for which the homogeneity, the transmission at 193 nm, the fluorescence and the laser damage stability must meet higher requirements, are areas of application of this invention. These include:

semi-finished products from synthetic quartz glass for producing projection systems for 248 nm applications, illumination system for 199 nm applications, projection systems for 193 nm applications, homogenous large plates (because of large flow paths), substrate blocks, especially ArF degrees, semi-finished products with pre-shaped surface contours.

LIST OF REFERENCE SYMBOLS

| | |
|---|---|
| 1 | furnace |
| 2, 3 | countersunk molds, component molds |
| 4, 5 | quartz glass blanks |
| 6 | base plate |
| 7 | pressure equipment |
| 8 | pressure plate |
| 9,10 | guiding means, guiding stands |
| 11,12 | upper surface |
| 13 | lower pressure surface |
| 14,19 | pressure means, pressure weights |
| 15,16 | connecting means, rods |
| 17,18 | heaters |

The invention claimed is:

1. A method for producing large-volume optical components of high optical quality from synthetic quartz glass blanks, comprising:

heating at least one quartz glass blank in at least one mold in an atmosphere of a protective gas to a temperature 30° to 170° K above the softening point of the quartz glass blank;

providing a guide structure, said guide structure being outside of the mold;

providing a pressure plate movably disposed along said guide structure;

providing a pressure device for applying pressure to said pressure plate;

pressing said pressure plate with said pressure device against an upper surface of said quartz glass blank, said upper surface being acted upon by a pressure of 10 to 500 kPa;

bringing the quartz glass blank into a shape determined by the mold, said pressure plate comprising a bushing through which said guide structure protrudes;

providing a furnace, said pressure plate being disposed within said furnace;

providing connecting means which connect said pressure device and said pressure plate, said pressure device being disposed outside of said furnace; and acting on said pressure plate with said pressure device by means of said connecting means.

2. The method of claim 1, wherein the heating temperature is maintained for 20 to 90 minutes.

3. The method of claim 1, wherein a release layer is provided between the pressure plate and the upper surface of said quartz glass blank.

4. The method of claim 1, wherein the quartz glass blank is heated at a rate of 1° to 50° K/min.

5. The method of claim 1, wherein a shaped quartz glass is cooled at a rate of less than 50° K/min.

6. The method of claim 1, wherein the pressure of the pressure plate on the quartz glass blank is variable.

7. The method of claim 1, wherein a lower surface of the pressure plate is curved.

8. The method of claim 1, wherein several molds are present simultaneously in a furnace.

9. The method of claim 1, wherein said guide structure comprises guides fastened to a base plate, said mold being on said base plate between said guides.

10. The method of claim 1, wherein a lower inner surface of the mold is curved.

11. The method of claim 1, wherein said pressure device comprises a weight which is applied to said pressure plate in said furnace through said connecting means.

12. The method of claims 9, 1, or 11, wherein said optical component produced has an edge length or diameter of at least 500 mm.

13. The method of claim 1, wherein said guide structure is disposed separately from said mold.

14. The method of claim 1, wherein said mold comprises graphite.

15. The method of claim 1, wherein said temperature is 1630° C. to 1770° C.

16. The method of claim 1, wherein said heating is done by a heater, said heater being disposed separately from said pressure plate.

17. The method of claim 1, wherein said mold is rectangular and wherein corners of said rectangular mold are filled completely by quartz glass from said quartz glass blank.

18. The method of claim 1, wherein said temperature is 1630° C. to 1730° C.

19. The method of claim 9, wherein said guides comprise three or four graphite stands.

20. A method for producing large-volume optical components of high optical quality from synthetic quartz glass blanks, comprising:

heating at least one quartz glass blank in at least one mold in an atmosphere of a protective gas to a temperature 30° to 170° K above the softening point of the quarts glass blank;

providing a guide structure, said guide structure being outside of the mold;

providing a pressure plate movably disposed along said guide structure;

providing a pressure device for applying pressure to said pressure plate;

pressing said pressure plate with said pressure device against an upper surface of said quartz glass blank, said upper surface being acted upon by a pressure of 10 to 500 kPa;

bringing the quartz glass blank into a shape determined by the mold, wherein said pressure plate comprises a bushing through which said guide structure protrudes; and arranging said quartz glass blank with a lower extremity of said quartz glass blank in said mold and said upper surface of said quartz glass blank outside of an upper opening of said mold, a portion of said quartz glass blank extending from said upper surface of said quartz glass blank to said upper opening of said mold being free of any lateral constraint.

21. A method for producing large-volume optical components of high optical quality from synthetic quartz glass blanks, comprising:

heating at least one quartz glass blank in at least one mold in an atmosphere of a protective gas to a temperature 30° to 170° K above the softening point of the quartz glass blank;

providing a guide structure, said guide structure being outside of the mold;

providing a pressure plate movably disposed along said guide structure;

providing a pressure device for applying pressure to said pressure plate;

pressing said pressure plate with said pressure device against an upper surface of said quartz glass blank, said upper surface being acted upon by a pressure of 10 to 500 kPa;

bringing the quartz glass blank into a shape determined by the mold, wherein said pressure plate comprises a bushing through which said guide structure protrudes; and providing a furnace wherein said pressure plate, said mold, and said guide structure are disposed within said furnace.

\* \* \* \* \*